April 17, 1962 A. C. MULLER 3,029,721
FOCAL PLANE SHUTTER FOR PHOTOGRAPHIC CAMERAS
Filed Feb. 13, 1958
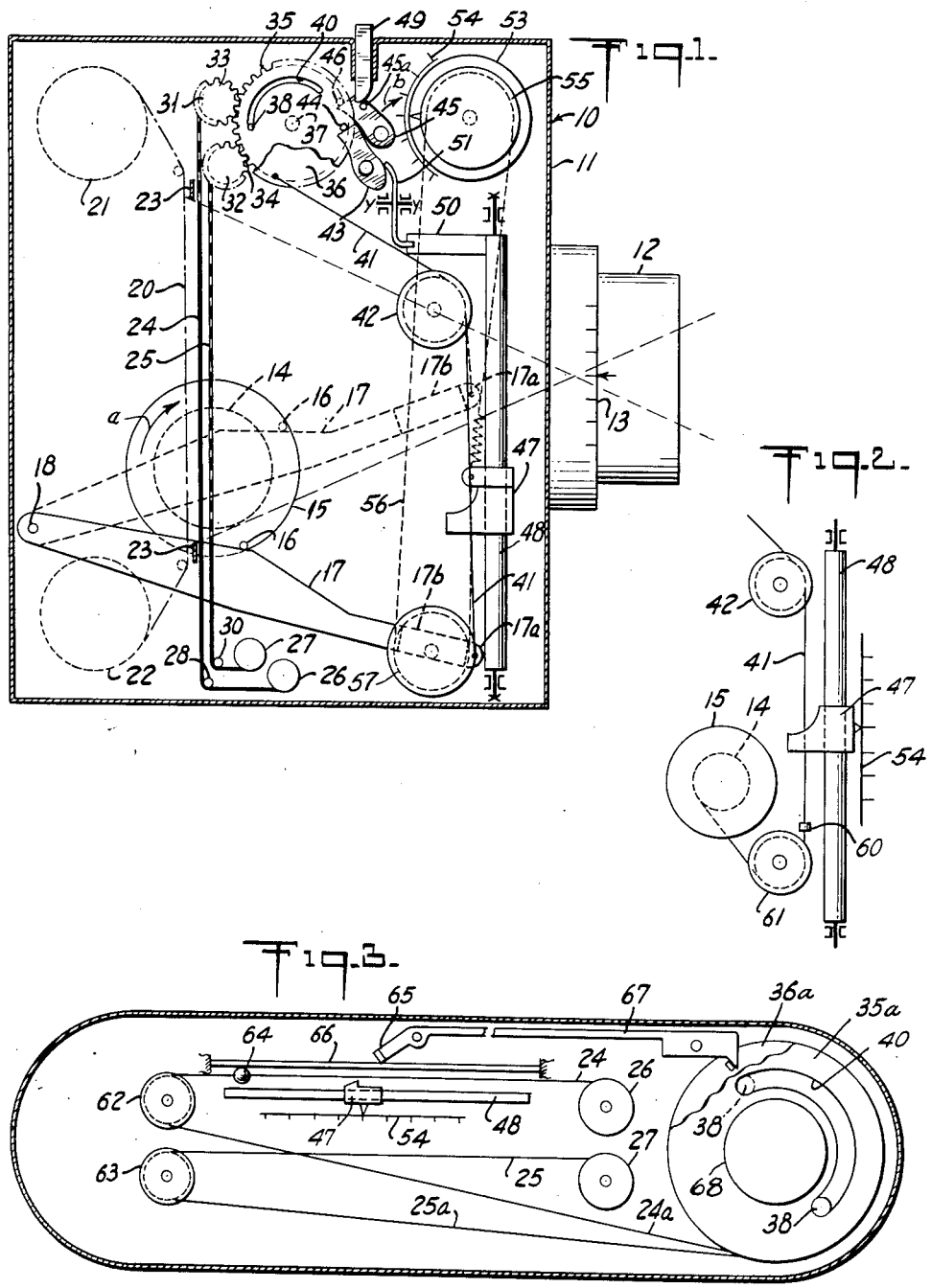
INVENTOR
ALEX C. MULLER
BY
ATTORNEY United States Patent Office 3,029,721
Patented Apr. 17, 1962

3,029,721
FOCAL PLANE SHUTTER FOR PHOTOGRAPHIC CAMERAS
Alex C. Muller, New York, N.Y., assignor of fifty percent to Albert W. Moser, New York, N.Y.
Filed Feb. 13, 1958, Ser. No. 715,006
7 Claims. (Cl. 95—57)

The present invention relates to focal plane or roller-blind type shutters for photographic cameras and an important object of the invention is to improve and simplify the design and construction, as well as the operation of shutters of this type.

Conventional focal plane camera shutters comprise essentially a pair of superposed spring-biased front and rear roller blinds or curtains provided with apertures equal to the image or picture area in the focal plane of a camera, said blinds or curtains being arranged to be wound and to move sequentially across the image or picture gate of the camera at a constant speed during unwinding, in such a manner that each aperture registers, respectively, with the picture area when the first or front blind is completely released and when the second or rear blind is in fully wound condition, while a light slit of predetermined width, to result in a definite exposure, travels across said gate during the unwinding operation. Furthermore, the travel of each of the blinds is advantageously such that the apertures are out of register with one another during the winding or cocking operation of the shutter, to provide what is known in the art as a self-capping focal plane shutter.

More specifically, in known embodiments of a focal plane shutter of this type, in order, upon operation of the shutter release knob or the like of the camera, to effect an exposure of the film or other sensitive material in the focal plane of the camera, release of the rear blind is delayed or retarded until after the front blind has travelled a predetermined distance, in such a manner as to provide a light slit between the two blinds of a definite width travelling across the picture area at a constant speed. Accordingly, the exposure time is proportional to the width of the slit between the two blinds or curtains, in a manner well known to and understood by those skilled in the art.

In a conventional focal plane shutter of this type, the control of the light slit and, in turn, of the exposure time is effected by means of relatively adjustable stops directly structurally embodied in the winding gear wheels or mechanism of the blinds which are usually mounted concentrically one above the other and operatively connected with the shutter cocking or winding means such as a winding knob, crank or the like, the latter being advantageously arranged or utilized to simultaneously advance the film from one or the next frame or picture, in the case of a roll film camera, to prevent double exposures, in a manner well known.

The use of the winding gear wheels or mechanism of the roller blinds to control the interval between the sequential release of the blinds and, in turn, to vary the exposure time, has serious disadvantages and shortcomings of both mechanical and operational nature, due mainly to the limited mounting space, whereby to require high mechanical precision of the cooperating parts and to result in high cost of the camera. This, in turn, has restricted the use of focal plane shutters to the medium and higher price brackets of photographic cameras.

Accordingly, a more specific object of the invention is the provision of an improved and simplified construction of a focal plane shutter for photographic cameras which substantially overcomes the above and related difficulties and shortcomings of the conventional high-precision focal plane shutter and which is both simple in design and efficient in operation, as well as relatively inexpensive, whereby to enable a more general use of focal plane shutters in both medium and low-priced photographic cameras.

Yet another object of the invention is the provision of a simplified and efficient light slit control mechanism for a focal plane shutter of the type described hereinabove, which will enable a variation and control of the exposure time within a relatively wide range efficiently and reliably, to insure high accuracy of the exposure adjustment.

Another object of the invention is the provision of improved and simplified light slit or exposure time control means embodied in a roller blind focal plane shutter of the type described and forming a unit separate from the winding or shutter cocking mechanism.

The invention, as to its ancillary objects as well as novel aspects, will be better understood from the following detailed description, taken in reference to the accompanying drawing forming part of this specification and wherein:

FIG. 1 is a side elevation of a photographic camera shown with the side wall removed and illustrating schematically and by way of example one form of focal plane shutter control mechanism constructed according to the principles of the invention;

FIG. 2 is a partial view illustrating a modification of FIG. 1; and

FIG. 3 is a diagrammatic top view of a camera showing an alternative focal plane shutter mechanism constructed in accordance with the invention.

In the drawing, like reference characters are used to denote like parts in the different views thereof.

With the foregoing objects in view, the invention, in the preferred embodiment, involves generally the provision of a resilient wire, ribbon, cable or the like flexible member connected to the winding mechanism of the roller blinds of a focal plane shutter of the type described and serving to cock or wind the shutter in any suitable manner, said cable or the like flexible member having a portion travelling to and fro along a predetermined linear path during the winding and unwinding operations of the shutter blinds, respectively. Cooperating with said cable or the like flexible member during its return or unwinding movement or travel, upon release of the first or front blind of the shutter, and being adjustably arranged along or in predetermined relation to said path, is a tripping element arranged to release the second or rear blind by way of a suitable connecting link or release mechanism. As a result, adjustment of said tripping element according to a suitably calibrated exposure scale results in a definite time interval between the instants of release of both said shutter blinds, thereby, in turn, controlling the width of the light slit travelling across the picture or image gate of the camera and resulting in a definite effective exposure of the film or other sensitive material in the focal plane of the camera.

The arrangement of the tripping element initiating the release of the second or rear shutter blind at a point separate from or exterior of the shutter winding or cocking mechanism, among other advantages, provides a greater flexibility in the design of the shutter control means, while the adjustment or setting of the element along a straight or curved path enables the attainment of an increased efficiency and accuracy of the shutter speed control at reduced cost, both with regard to the component parts as well as labor required in assembling and testing of the shutter. Furthermore, by the proper design of the component elements, such as the shape of the adjusting path of said tripping element, a desired functional relationship may be achieved simply and efficiently between the adjusting or exposure scale and the effective exposure time, such as according to a linear relation or any other adjusting law or function.

Referring more particularly to FIG. 1 of the drawing, the improved shutter control mechanism shown is especially, though not limitatively, suited for use in box type cameras, such as a reflex plate or roll film camera shown by way of example and comprising a camera body 10 having fitted to its front wall 11 a lens mount 12 provided with a focussing scale 13 and the usual lens aperture adjusting means (not shown). A winding knob or the like 14 being mounted upon a disc 15 carries a pin or the like 16 arranged to engage or cam with a shutter winding lever 17 shown in both its normal or unwound (dashed line) and its wound (full line) positions, respectively. The knob 14 and disc 15 are mounted for clockwise rotation as indicated by the arrow $a$ in the drawing. The winding lever 17 is pivoted at 18 upon the side wall or upon a special mounting wall within the camera body which may also support the winding knob 14.

The film indicated by the dot-dash line 20 is passed in the usual manner from a supply spool 21 to a take-up spool 22 past the picture or image gate 23 of the camera over suitable guide rollers and a film pressure plate (not shown), in accordance with usual camera constructions and practice. The winding of the film may be combined with the shutter winding operation, while the advance of the film from one to the next exposure frame may be controlled by a suitable film stop and counting mechanism, to prevent both double exposure and blank frames, in a manner well known. Finally, the camera may be designed for use with sheet film or glass plates, these and other details outside the purview of and unnecessary for the understanding of the invention having been omitted for simplicity of disclosure and clarity of the drawing.

The front and rear spring roller blinds of the shutter are shown at 24 and 25, respectively, the apertures of the blinds corresponding to and having a width equal to the width of the picture area or film gate 23 and being indicated in dotted lines in the drawing. The blinds are so arranged that, in the wound condition of the shutter, as shown in the drawing, the aperture of the following or rear blind 25 is in registry with the picture gate 23, while in the unwound condition of the shutter, the aperture of the leading or front blind 24 is in registry with the gate 23. The arrangement and operation of the blinds is furthermore such that the apertures are fully out of registry with one another during the winding operation, to provide what is known as a self-capping focal plane shutter, as pointed out hereinabove. Items 26 and 27 indicate the spring rollers of the blinds 24 and 25 which pass over suitable guide rollers 28 and 30 arranged at one side of the picture gate 23 and are arranged to be wound upon and unwound from a pair of winding rollers 31 and 32, respectively, located at the opposite side of the picture gate 23. The rollers 31 and 32 carry pinions 33 and 34 which mesh with a pair of winding gears 36 and 35, respectively, wheel 35 being shown partly broken away in the drawing. The gear wheels 35 and 36 are rotatable independently about a spindle 37 and coupled with one another through a pin and slot coupling 38, 40 or the like, whereby both wheels or gears may be wound in unison in anticlockwise direction, such as by rotation of the lower gear 36, in the example shown in the drawing, to cock or wind the shutter to the position shown in the drawing, while enabling a separate or sequential release or unwinding of the blinds in the opposite direction by the tripping and exposure control mechanism according to the invention, as described presently.

More specifically, according to the invention, the shutter is wound by means of a flexible wire, ribbon, cable or the like flexible member 41 having one end attached to the winding gear 36, in the example shown, said cable or the like flexible member, after passing over guide roller 42, having its opposite end attached to the free end 17a of the winding lever 17, whereby to wind the gears 35 and 36 and, in turn, the blinds 24 and 25 by operation of the lever 17 from the normal or dashed line position to the operative or full line shutter position, by rotation of the shutter winding knob 14, in the manner described hereinabove. Upon reaching the fully wound position of the shutter, the blinds 24 and 25 are locked by a pair of spring-urged pawls 45 and 43 engaging stops or projections 46 and 44 upon the gears 36 and 35, respectively.

Arranged to intercept the path of the portion 17b of winding lever 17 is a tripping member 47 slidably and non-rotatively mounted upon a rod or square shaft 48 which is rotatively mounted about its longitudinal axis $x$—$x$ and has an angular extension 50 rigid with or secured to one end thereof. Engaging the extension 50 is one of the ends of a coupling lever 51 rotatable about an axis $y$—$y$ at right angles to the axis $x$—$x$, the other end of lever 51 being adapted to cam with or engage and release the pawl 43, upon engagement of the tripping member by the enlarged or vaulted portion 17b of the winding lever 17 and slight rotation of shaft 48 during the return movement or travel of lever 17 from the wound (full line) to the unwound (dashed line) position.

As a result, upon initial release of the leading or front shutter blind 24 by the pawl 45 by rotating the latter in anticlockwise direction, as shown by the arrow $b$, by the operation of the exposure release knob or the like release element 49 of the camera camming with a pin 45a or the like upon the pawl 45, release of the following or rear blind 25 will be retarded by varying time intervals depending upon the position of the tripping member 47 upon the shaft 48, thus resulting in a correspondingly varying delay time or a varying light slit between the blinds and, in turn, in an effective exposure time control, as will be understood from the foregoing. The member 47 may be adjusted in accordance with a direct-reading exposure time scale 54, FIG. 2, or the exposure time may be indicated by a separate dial 53 having an index cooperating with a stationary scale 54 calibrated in exposure times and fitted with a control knob 55. The latter is operatively connected with the tripping member 47, such as through a wire-pulley coupling 56, 57, or in any other suitable manner. The fact that member 47 is tripped by the portion 17b of lever 17 during both the forward (winding) and return (unwinding) movements of the latter, does not interfere with the proper function of the exposure control, since during the winding operation of the gears 35 and 36 the pawls 43 and 45 are out of engagement with the stops 44 and 46 or equivalent locking means (ratchets etc.) of the gears.

According to the FIG. 2 modification of the invention, the element 47 is tripped by a knob or the like 60 directly attached to the wire or winding cable 41 which for this purpose is passed over a second guide roller 61 and has its end directly attached to the winding knob 14.

According to the modification shown by FIG. 3 being especially suitable for use in focal plane miniature or the like cameras, the blinds 24 and 25 are provided with extension cables 24a and 25a which, upon passing over guide rollers 62 and 63, are attached each to one of the winding wheels 35a and 36a in the form of discs connected through a slot and key coupling 38, 40, with one of the discs arranged for winding directly by the shutter winding knob 68 or the like of the camera, in a manner readily understood. The front blind 24 carries a tripping knob or the like 64 which upon engaging the adjustable tripping element 47 deflects a further pivoted member 65 by slightly bending a flexible wire 66. This, in turn, initiates the release of the rear blind 25 through the action of a further tripping lever 67, and a suitable connection (not shown) provided between members 65 and lever 67 whereby rotation of member 65 clockwise as seen in FIG. 3 rotates lever 67 counterclockwise.

The winding disc 35a connected to the front blind 24 may be locked in the wound position of the shutter and released in the same manner as in FIG. 1 by the provision of a locking pawl 45 and release button 49, FIG. 3 differing from FIG. 1 essentially by the replacement of the gear driver 33, 36 and 32, 35 by the simple winding discs 35a and 36a and flexible cables 24a and 25a, respectively.

As will be seen, a shutter speed control device of the type according to the invention and described herein has the advantage, among others, that the speed adjusting mechanism can be designed independently of the roller blind winding or operating means, whereby to result in simplicity of mechanical design as well as increased accuracy and reliabilty of the exposure time adjustment or control. Furthermore, the relationship between the effective exposure time and the adjusting positions of the control member can be varied to follow a linear or non-linear law, by a suitable shape of the adjusting path of the tripping member 47 or of the actuating or camming member 17b or 60, respectively.

In the foregoing, the invention has been described in reference to a specific illustrative device. It will be evident, however, that variations and modifications, as well as the substitution of equivalent parts and elements for those shown and described herein for illustration, may be made without departing from the broader scope and spirit of the invention, as set forth in the appended claims. The specification and drawing are accordingly to be regarded in an illustrative rather than in a restrictive sense.

I claim:

1. A focal plane shutter for photographic cameras comprising first and second winding rollers each having a driving gear, a spring-loaded leading shutter blind connected to said first roller, a spring-loaded following shutter blind connected to said second roller, a first winding gear driving said first roller, a second winding gear concentric to said first winding gear and driving said second roller, a slot and pin coupling between said winding gears, whereby rotation of the first winding gear in one direction causes a simultaneous winding of both said blinds, while enabling independent rotation of said winding gears and unwinding of said blinds in the opposite direction, first and second locking means for arresting said first and second winding gears, respectively, in the wound position of said blinds, shutter winding means operatively connected to said first winding gear, shutter release means to unlock said first locking means, to initiate an exposure by unwinding of said first blind, and means to control the initiation of unwinding of said following blind in predetermined timed relation to the unwinding of said leading blind comprising flexible cable means operatively connected to said first winding gear for winding and unwinding thereby, said cable means arranged to move along a substantially straight path exterior of said winding gears, a tripping member connected to said cable means at a point so as to move along said path during the winding and unwinding of said first winding gear, a release member adjustably mounted along said path in cooperative relation with said tripping member, and coupling means between said release member and said second locking means, to initiate the unwinding of said second blind upon engagement of said release member by said tripping member during the unwinding of said leading blind.

2. In a focal plane shutter as claimed in claim 1, said winding means including an oscillating lever pivoted at one end and having its free end connected to said cable means, to move within a predetermined angle, said free end forming said tripping member cooperating with said release member.

3. In a focal plane shutter as claimed in claim 1, including an oscillating lever pivoted at one end and means to operate the same by said winding means, to cause said lever to move within a predetermined angle, said lever having its free end connected to said cable means and forming said tripping member cooperating with said release member.

4. A focal plane shutter for photographic cameras comprising a pair of first and second winding rollers, a pair of leading and following shutter blinds connected to said first and second rollers, respectively, shutter winding means for said rollers effective for winding both said rollers and blinds in one direction against spring tension, while enabling independent unwinding of said rollers and blinds in the opposite direction, first and second locking means to arrest said blinds, respectively, in the wound position, means to release said first locking means, to initiate an exposure by unwinding of said leading blind, and further means to control the initiation of unwinding of said following blind in predetermined timed relation to the release of said leading blind comprising a flexible cable operatively connected to said winding means for winding and unwinding thereby, respectively, in synchronism with the winding and unwinding of said leading blind, said cable arranged to move along a substantially straight path exterior of said winding means a tripping member connected to said cable at a point so as to move along said path during the winding and unwinding of said leading blind, a release member adjustably mounted along said path in cooperative relation with said tripping member, and coupling means between said release member and said second locking means, to release said following blind upon engagement of said release member by said tripping member during the unwinding of said leading blind.

5. In a focal plane shutter as claimed in claim 1, said coupling means including a rotatable shaft with said release member adjustably mounted upon said shaft, in such a manner to temporarily rotate said shaft upon engagement of said release member by said tripping member during the unwinding of said first winding gear, and means to release said second locking means upon rotation of said shaft.

6. In a focal plane shutter as claimed in claim 1, including an oscillating lever forming an operative part of said winding means, said lever having one end connected to said cable means and being pivoted at its opposite end to move through a predetermined angle during the winding and unwinding of said leading blind gear, said tripping member arranged upon said first end of said lever and adapted to cooperate with said release member during the unwinding of said leading blind.

7. In a focal plane shutter as claimed in claim 4, said coupling means including a rotatable shaft with said release member adjustably mounted upon said shaft, in such a manner to temporarily rotate said shaft upon engagement of said release member by said tripping member during the unwinding of said first winding gear, and means to release said second locking means to release said second locking means upon rotation of said shaft.

References Cited in the file of this patent
UNITED STATES PATENTS

| | | |
|---|---|---|
| 1,652,553 | Barnack | Dec. 13, 1927 |
| 2,238,499 | Mihalyi | Apr. 15, 1941 |
| 2,338,628 | Fairbanks | Jan. 4, 1944 |
| 2,358,061 | Drotning | Sept. 12, 1944 |
| 2,472,607 | Mihalyi | June 7, 1949 |